(12) United States Patent
Riefe

(10) Patent No.: US 10,328,966 B2
(45) Date of Patent: Jun. 25, 2019

(54) STEERING COLUMN ADJUSTMENT ASSEMBLY

(71) Applicant: STEERING SOLUTIONS IP HOLDING CORPORATION, Saginaw, MI (US)

(72) Inventor: Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 185 days.

(21) Appl. No.: 15/620,005

(22) Filed: Jun. 12, 2017

(65) Prior Publication Data

US 2018/0354545 A1 Dec. 13, 2018

(51) Int. Cl.
| | |
|---|---|
| *B62D 1/184* | (2006.01) |
| *B62D 1/183* | (2006.01) |
| *B62D 1/189* | (2006.01) |
| *B62D 1/181* | (2006.01) |
| *B62D 1/19* | (2006.01) |
| *B60R 21/01* | (2006.01) |

(52) U.S. Cl.
CPC .............. *B62D 1/183* (2013.01); *B60R 21/01* (2013.01); *B62D 1/181* (2013.01); *B62D 1/189* (2013.01); *B62D 1/197* (2013.01)

(58) Field of Classification Search
CPC ......... B62D 1/183; B62D 1/181; B62D 1/189
USPC ................................ 74/492, 493; 701/45, 47
See application file for complete search history.

(56) References Cited

U.S. PATENT DOCUMENTS

| | | | | |
|---|---|---|---|---|
| 5,398,185 A | * | 3/1995 | Omura | B60R 21/01538 180/268 |
| 5,626,359 A | * | 5/1997 | Steffens, Jr. | B60R 21/013 180/268 |
| 5,670,853 A | * | 9/1997 | Bauer | B60N 2/002 180/273 |
| 5,702,123 A | * | 12/1997 | Takahashi | B60R 21/01536 280/735 |
| 5,871,232 A | * | 2/1999 | White | B60R 21/01532 280/735 |
| 5,954,360 A | * | 9/1999 | Griggs, III | B60N 2/002 180/268 |
| 7,359,527 B2 | * | 4/2008 | Breed | B60N 2/002 180/271 |
| 2008/0023946 A1 | * | 1/2008 | Haag | B60R 21/013 280/735 |
| 2018/0348759 A1 | * | 12/2018 | Freeman | G05D 1/0061 |

* cited by examiner

*Primary Examiner* — Toan C To
(74) *Attorney, Agent, or Firm* — Cantor Colburn LLP

(57) ABSTRACT

A steering column adjustment assembly includes a steering column that is automatically adjustable in an autonomous or semi-autonomous driving mode. Also included is a controller receiving information from at least one detection component, the controller adjusting the steering column in the autonomous or semi-autonomous driving mode to a position that is selected for an impact event, the position determined by at least one factor related to the information received from the at least one detection component.

18 Claims, 2 Drawing Sheets

STEERING COLUMN ADJUSTMENT ASSEMBLY

BACKGROUND OF THE INVENTION

The invention described herein relates to steering column assemblies and, more particularly, to steering column assemblies for autonomous vehicles.

The driver of a vehicle customarily adjusts the fore-aft and vertical position of the steering column and wheel to enable a preferred vision of the instrument cluster displays, as well as the most comfortable reach position for the driver. However, this adjustment position may not be the best for impact performance. In other words, the driver's head, chest, knees, hips, etc. may be better located, relative to vehicle components, to take advantage of energy absorbing devices such as an airbag, steering wheel rim, and energy absorbing steering column, among other components.

SUMMARY OF THE INVENTION

In one aspect of the invention, a steering column adjustment assembly includes a steering column that is adjustable over a range of positions, the steering column manually adjustable by a driver in a manual driving mode and automatically adjustable in an autonomous or semi-autonomous driving mode. Also included is at least one sensor detecting a seated configuration of a driver. Further included is a controller in operative communication with the at least one sensor, the controller adjusting the steering column in the autonomous or semi-autonomous driving mode to a position that is selected for an impact event, the position determined at least partially by the seated configuration of the driver.

In another aspect of the invention, a steering column adjustment assembly includes a steering column that is automatically adjustable in an autonomous or semi-autonomous driving mode. Also included is a controller receiving information from at least one detection component, the controller adjusting the steering column in the autonomous or semi-autonomous driving mode to a position that is selected for an impact event, the position determined by at least one factor related to the information received from the at least one detection component.

In yet another aspect of the invention, a method of adjusting a steering column assembly is provided. The method includes obtaining data related to a seated configuration of a driver with a plurality of sensors. The method also includes communicating the data to a controller. The method further includes determining a seated configuration of the driver with the controller. The method yet further includes determining a selected position of a steering column based on the seated configuration of the driver. The method also includes adjusting the steering column to the selected position during operation of the steering column in an autonomous or semi-autonomous driving mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various features of a steering column adjustment assembly 10 for an autonomous or semi-autonomous vehicle are illustrated. As described herein, the embodiments provide a steering column that is manually adjustable by a driver in a manual driving mode to suit the driver's preference, but automatically adjusted in an autonomous or semi-autonomous driving mode to select the position of the steering column for an impact event.

The steering column adjustment assembly 10 is part of, or works in conjunction with, an autonomous driving assisted steering (ADAS) system that is able to steer as well as control other parameters of the vehicle to operate it without direct driver involvement. Autonomous or semi-autonomous driving refers to vehicles that are configured to perform operations without continuous input from a driver (e.g., steering, accelerating, braking etc.) and may be equipped with technology that allows the vehicle to be autonomously or semi-autonomously controlled using sensing, steering, and/or braking technology.

Figure 1:
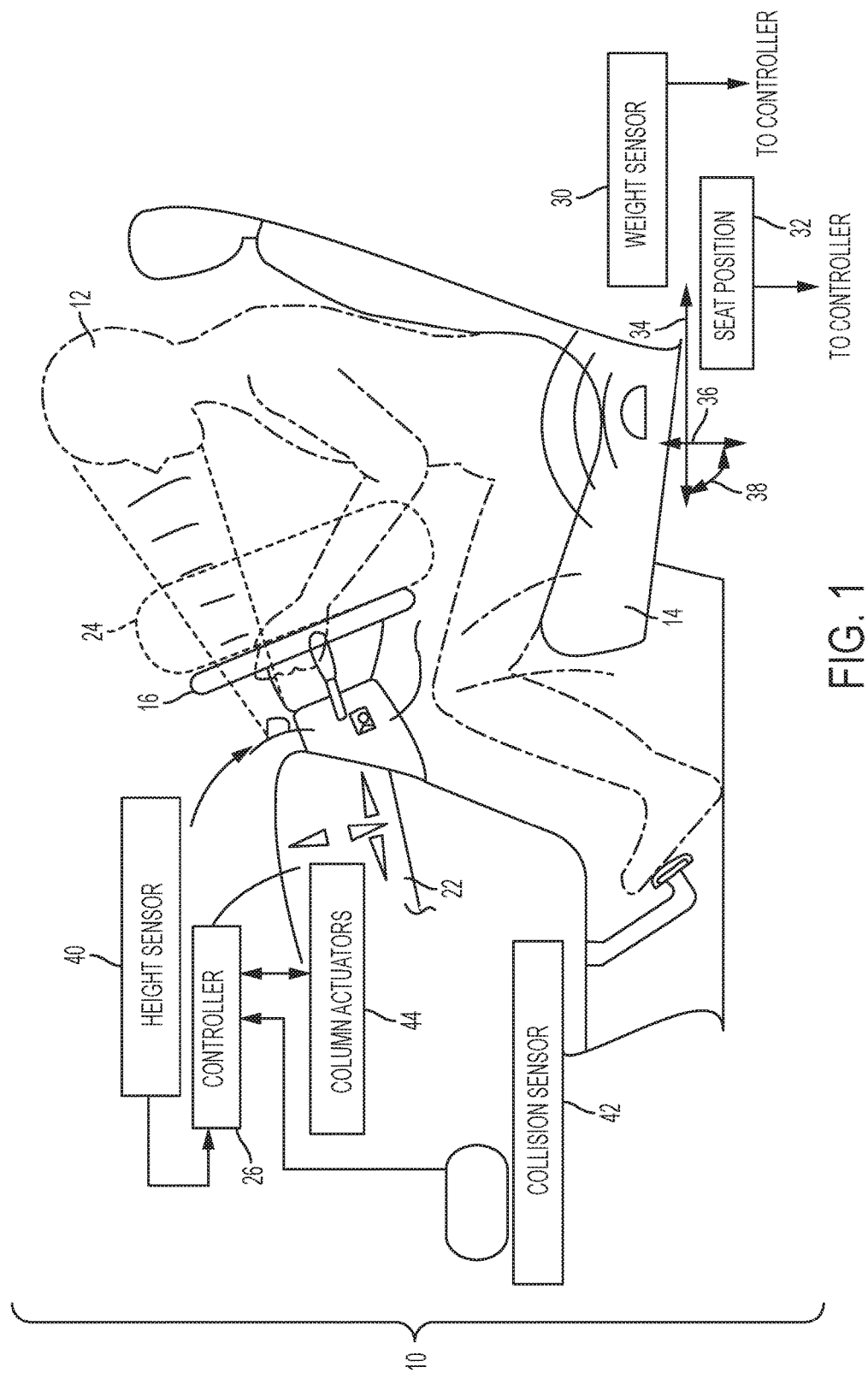
FIG. 1 is a perspective view of a steering column adjustment assembly.

Referring to FIG. 1, components of the steering column adjustment assembly 10 are illustrated. As shown, a driver 12 of the vehicle is positioned in a seated manner in a vehicle seat 14. The driver 12 is positioned to grasp a steering wheel 16 that facilitates vehicle directional control input commands. The driver 12 has a line of sight 18 to an instrument panel 20 that includes various features, including speedometer, odometer, fuel gauge, etc. The driver's line of sight 18 may be impeded by the steering wheel 16 in some positions. Therefore, the driver 12 may manually adjusts a steering column 22 to reposition the steering wheel 16 to a position that suits the preference of the driver. This position will be different for various drivers, based on numerous factors, including the seat height of the individual, the position of the vehicle seat 12, etc. Manual adjustment may be facilitated in a typical manner, such as with an adjustment lever or one or more buttons that are accessible to the driver. Manual adjustment is performed in a manual driving mode of the vehicle. For purposes herein, a manual driving mode refers to a driving mode that requires steering control by the driver. In such a mode, the ADAS system is not solely relied upon for steering control of the vehicle.

Figure 2:
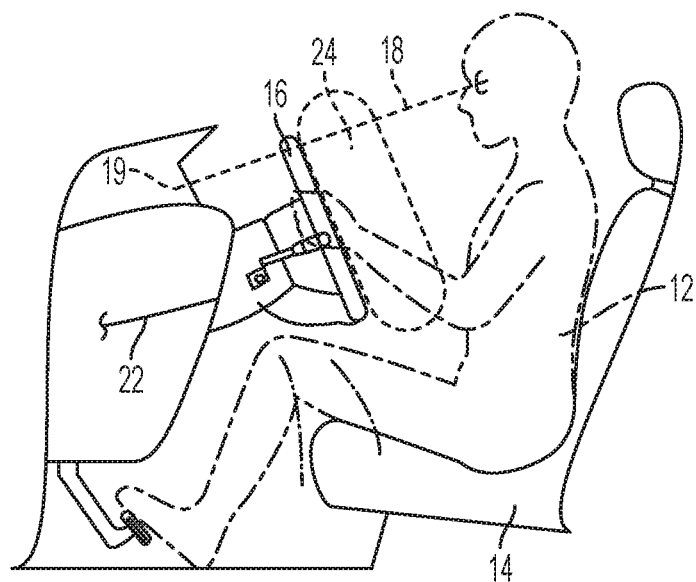
FIG. 2 is a perspective view of a steering column of the steering column adjustment assembly in a first position.

Referring now to FIGS. 1 and 2, the manually selected position of the steering column 22 and the steering wheel 12 is illustrated. Although this position is preferred by the driver 12 for the above-described reasons, it is not necessarily a position that is well suited for an impact event. A well suited position for an impact event refers to a condition or position that reduces the risk or severity of injury to the driver 12. The selected position is based on numerous factors, including a seated configuration of the driver 12, which may include driver size, driver position and the position of the vehicle seat 14. Additionally, other factors such as vehicle speed may influence the selected position. Each of the above-noted factors dictate an angle and distance at which the driver 12 is oriented relative to the steering wheel 16 and therefore an orientation relative to energy absorbing components utilized to reduce the likelihood of injury during an impact event. For example, an airbag 24 or internal steering column energy absorbing components (not shown) may be utilized.

Figure 3:
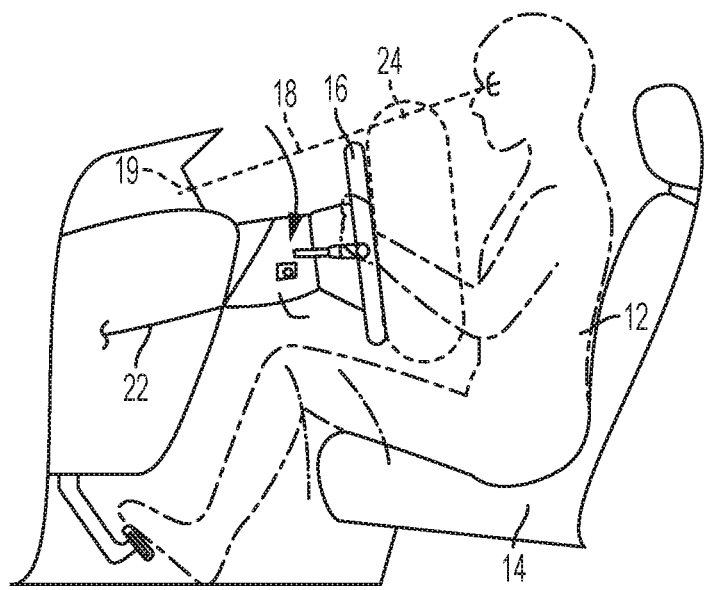
FIG. 3 is a perspective view of the steering column in a second position.

Referring to FIG. 3, a selected position of the steering column 22 and the steering wheel 16 is illustrated. The steering column adjustment assembly 10 automatically adjusts the steering column 22 when an autonomous or semi-autonomous driving mode is enabled. In such a mode, the ADAS system is relied upon for steering control of the vehicle, such that the driver 12 is not required to perform steering input commands. When the ADAS system is being used in the vehicle by the driver 12, the importance of visibility of the instrument panel and steering wheel positional comfort are reduced or eliminated. Instead, the advantages of providing a selected position of the steering column 22 and steering wheel 16 may be obtained while not hindering the driving experience.

As shown in FIG. 1, the steering column adjustment assembly 10 includes one or more detection components to detect one or more conditions that are employed to determine the selected position of the steering column 22. As described herein, the detection components provide data to a controller 26 that is part of the steering column adjustment assembly 10. As described above, the steering column adjustment assembly 10 is part of the ADAS system in some embodiments. Therefore, the controller 26 is part of the ADAS system in some embodiments. The detection components may be sensors or the like. Examples of detection components are illustrated. In particular, a weight sensor 30 is provided to detect a weight and/or weight distribution of the driver 12. A seat position sensor 32 or other seat position detection component is provided to determine a position of the vehicle seat 14. The position of the vehicle seat 14 may include information about more than one positional component, such as a translation component in the longitudinal direction 34 of the vehicle, a translation component in the vertical direction 36 of the vehicle, and/or a rotational position 38 of the vehicle seat 14 (i.e., seat tilt). Additionally, a height sensor 40 is provided to determine a vertical position of the driver 12. In the illustrated embodiment, the height sensor 40 determines a position of the driver's head or part of the driver's head. It is to be appreciated that other parts of the driver may be evaluated for vertical position, including a driver chest position and/or a driver knee position, for example. The height sensor 40 may comprise a camera based system in some embodiments. A collision sensor 42 is provided in some embodiments to provide data related to potential impacts or other vehicle data. Vehicle speed is also provided to the controller 26 in some embodiments. Therefore, data related to the seated configuration of the driver 12 and other vehicle information is collected. Each of the detection components are in operative communication with the controller 22 and transmit the data to the controller 26 for processing therein.

Upon receipt of the data, the controller 26 analyzes the data to determine the selected position of the steering column 22. The controller 26 has a table or the like stored therein, and the received data is processed in comparison to the table to determine the selected position. Based on the determination, the controller 26 commands at least one column actuator 44 that is in operative communication with the controller 26 to automatically adjust the steering column 22 to the determined position. It is contemplated that some combinations of data will lead to the determination that the energy absorbing component(s) associated with steering column 22 and/or steering wheel 16 will not be advantageous. This may lead to the determination that retracting the steering wheel 16 toward the instrument panel to a fully retracted position is best suited for the combination of data. For example, an extremely tall or short driver may trigger such a determination. A significantly heavy or light individual may do so as well. Finally, if a driver adjusts the vehicle seat 14 to a position that is not compatible with efficient use of the energy absorbing components, the fully retracted position may be employed.

It is contemplated that the driver 12 may not desire repositioning of the steering column 22 and the steering wheel 16 even when the vehicle is in the autonomous or semi-autonomous driving mode. To accommodate such a situation, some embodiments provide an override option that allows a user to maintain the positioning that is preferred in the manual mode (i.e., a manual adjustment mode) or some other position that may be beneficial for non-driving activities, such as a work surface or the like. The override may be accomplished with a button, knob, lever, voice command or any other suitable manner.

In some embodiments, a key fob includes "special crash pre-set(s)" that would override the tabular data of the vehicle which contain "normal" crash settings. For example, a pre-set for a pregnant woman, or someone recovering from surgery may be provided. This could be a temporary setting that caused the steering column 22 to fully retract.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column adjustment assembly comprising:
    a steering column that is adjustable over a range of positions, the steering column manually adjustable by a driver in a manual driving mode and automatically adjustable in an autonomous or semi-autonomous driving mode;
    at least one sensor detecting a seated configuration of a driver; and
    a controller in operative communication with the at least one sensor, the controller adjusting the steering column in the autonomous or semi-autonomous driving mode to a position that is selected for an impact event, the position determined at least partially by the seated configuration of the driver.

2. The steering column adjustment assembly of claim 1, wherein the at least one sensor is one of a plurality of sensors.

3. The steering column adjustment assembly of claim 2, wherein a weight sensor is one of the plurality of sensors.

4. The steering column adjustment assembly of claim 2, wherein a height sensor is one of the plurality of sensors.

5. The steering column adjustment assembly of claim 2, wherein a seat position sensor is one of the plurality of sensors.

6. The steering column adjustment assembly of claim 1, wherein the position that is selected for an impact event is determined by a plurality of factors.

7. The steering column adjustment assembly of claim 6, wherein the plurality of factors comprises at least two of a weight of the driver, a seated height of the driver, a seat position of a seat that the driver is seated in, and a vehicle speed.

8. The steering column adjustment assembly of claim 1, wherein the steering column is retracted to a fully retracted position if the determined position is outside of a range of positions stored in the controller.

9. The steering column adjustment assembly of claim 1, wherein the steering column is adjusted with at least one column actuator that is in operative communication with the controller.

10. The steering column adjustment assembly of claim 1, including a manual adjustment mode of the steering column to manually adjust the steering column in the autonomous driving mode.

11. A steering column adjustment assembly comprising:
a steering column that is automatically adjustable in an autonomous or semi-autonomous driving mode; and
a controller receiving information from at least one detection component, the controller adjusting the steering column in the autonomous or semi-autonomous driving mode to a position that is selected for an impact event, the position determined by at least one factor related to the information received from the at least one detection component.

12. The steering column adjustment assembly of claim 11, wherein the at least one detection component detects at least one of a weight of a driver, a seated height of the driver, a seat position of a seat that the driver is seated in, and a vehicle speed.

13. The steering column adjustment assembly of claim 11, wherein the steering column is retracted to a fully retracted position if the determined position is outside of a range of positions stored in the controller.

14. The steering column adjustment assembly of claim 11, wherein the steering column is automatically adjusted with at least one column actuator that is in operative communication with the controller.

15. The steering column adjustment assembly of claim 11, wherein the driver may override the automatic adjustment of the steering column to manually adjust the steering column in the autonomous or semi-autonomous driving mode.

16. The steering column adjustment assembly of claim 11, wherein the steering column is manually adjustable by a driver in a manual driving mode.

17. A method of adjusting a steering column assembly comprising:
obtaining data related to a seated configuration of a driver with a plurality of sensors;
communicating the data to a controller;
determining a seated configuration of the driver with the controller;
determining a selected position of a steering column based on the seated configuration of the driver; and
adjusting the steering column to the selected position during operation of the steering column in an autonomous or semi-autonomous driving mode.

18. The method of claim 17, wherein the data obtained comprises at least one of driver weight data, driver seated height data, and seat position data.

* * * * *